United States Patent
Katayama

[11] 3,909,060
[45] Sept. 30, 1975

[54] COVER FOR THE STORAGE AREA OF AN AUTOMOBILE

[75] Inventor: Yutaka Katayama, Los Angeles, Calif.

[73] Assignee: Yutaka Katayama, Los Angeles, Calif.

[22] Filed: May 3, 1974

[21] Appl. No.: 466,815

[52] U.S. Cl. ............................ 296/37 R; 296/76
[51] Int. Cl.² ................................... B60R 5/04
[58] Field of Search .......... 296/24 R, 37 R, 76, 100; 150/52 F, 52 E

[56] References Cited
UNITED STATES PATENTS

| | | | |
|---|---|---|---|
| 526,324 | 9/1894 | Muhlberg | 296/24 R |
| 3,181,911 | 5/1965 | Peras | 296/37 R |
| 3,503,648 | 3/1970 | James | 296/37 R |

FOREIGN PATENTS OR APPLICATIONS

| | | | |
|---|---|---|---|
| 1,069,481 | 11/1959 | Austria | 296/37 R |

Primary Examiner—Robert J. Spar
Assistant Examiner—Gary Auton
Attorney, Agent, or Firm—Wegner, Stellman, McCord, Wiles & Wood

[57] ABSTRACT

This invention provides an opaque cover for the storage area of an automobile so constructed and arranged that the cover automatically raises with the car lid covering the storage area to expose such area, and covers the storage area automatically as the car lid is closed. The invention is particularly adaptable to the hatchback type of body construction wherein the lid covering the storage area includes a window, with the cover of the present invention underlying the window and protecting the contents of the area from sunlight and also obscuring the contents from view.

3 Claims, 6 Drawing Figures

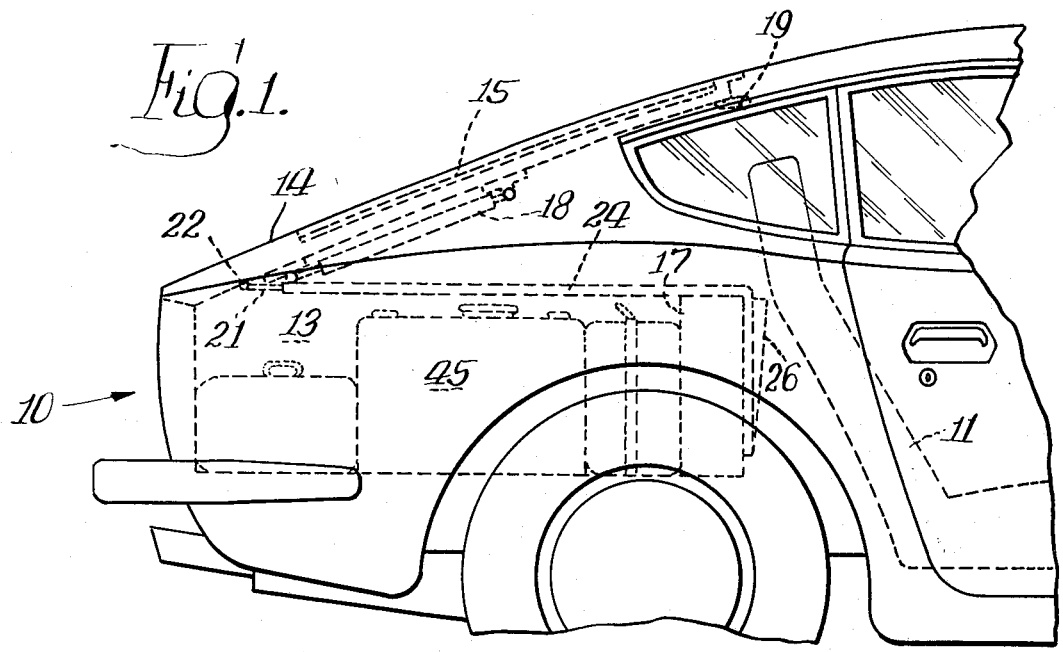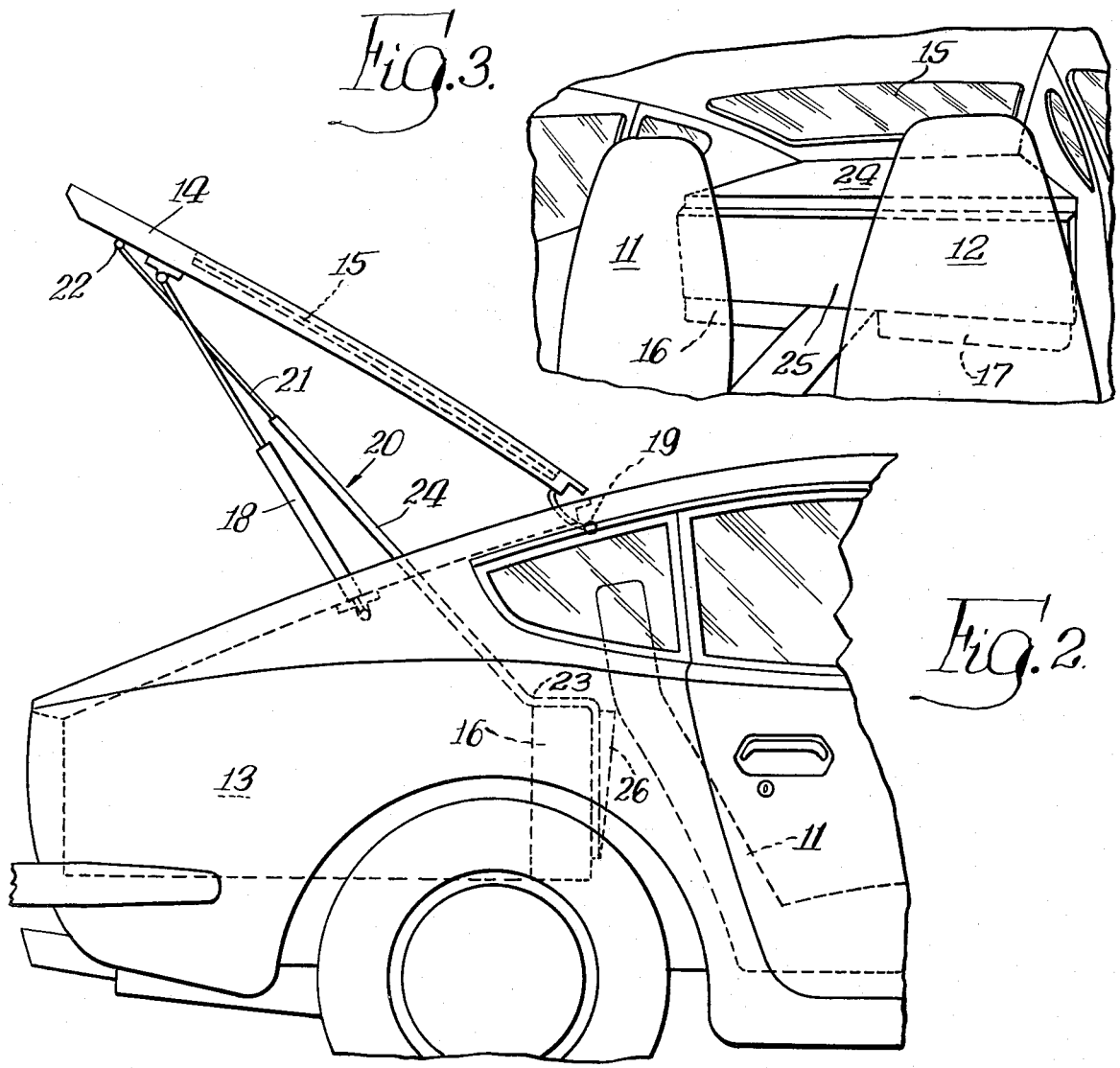

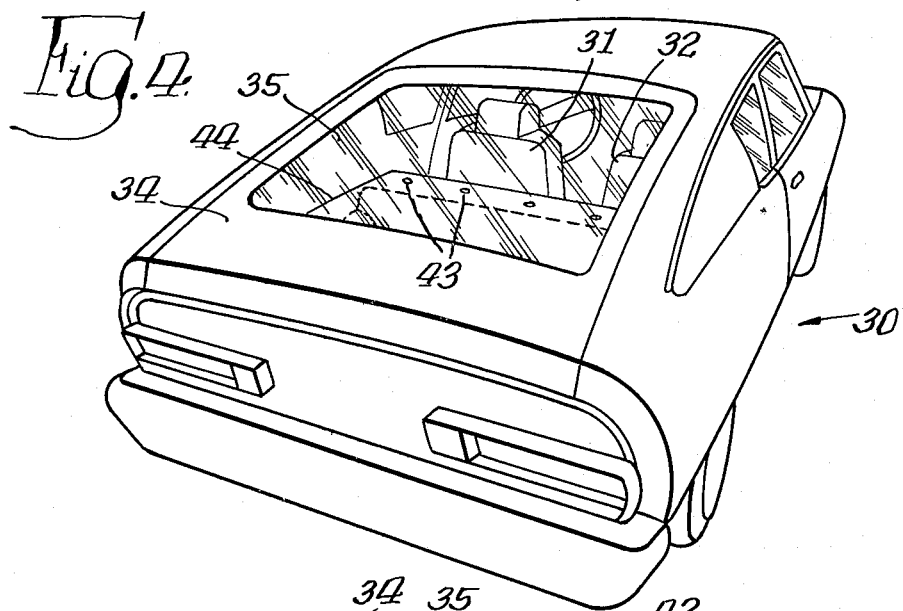
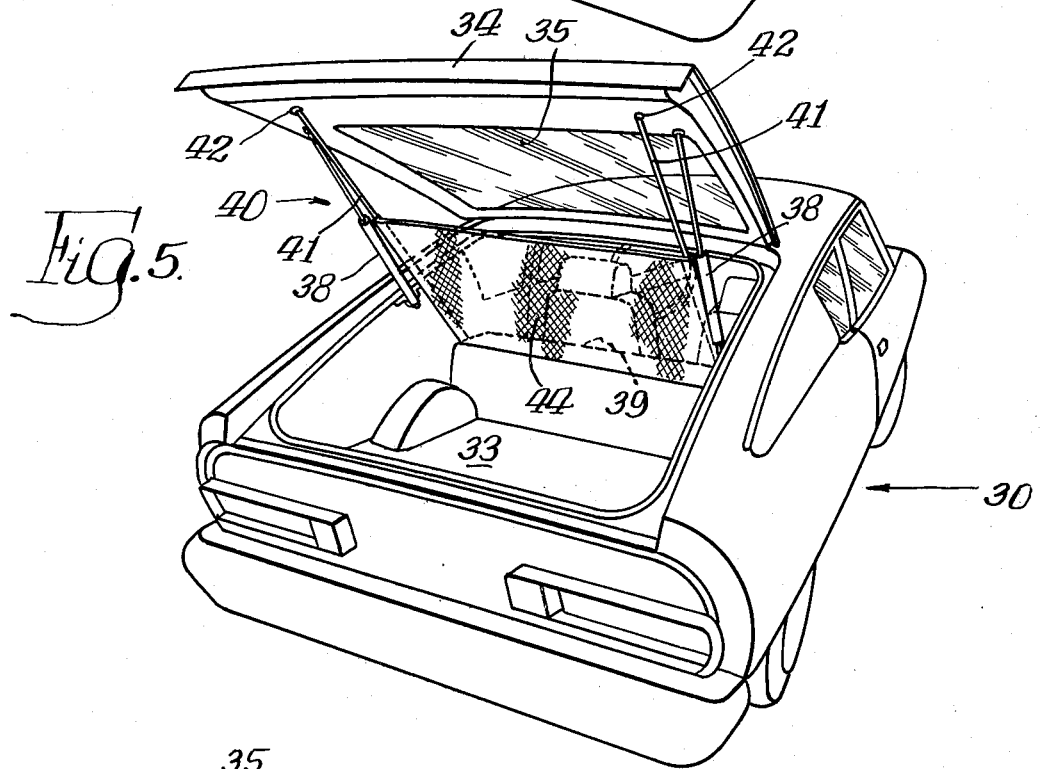
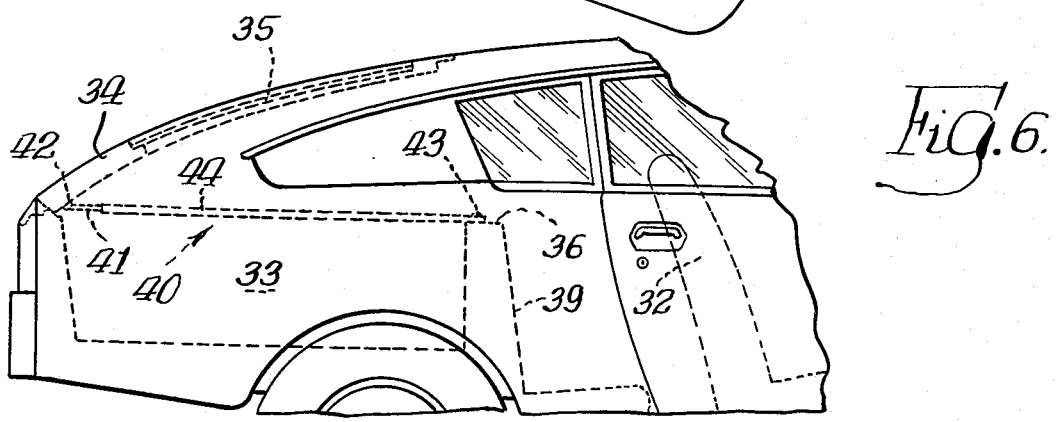

COVER FOR THE STORAGE AREA OF AN AUTOMOBILE

BACKGROUND OF THE INVENTION

In the hatchback design of automobile which is quite popular, the hatchback is provided with a window which affords the driver of the car vision to the rear. As the window overlies the storage area of the automobile, articles placed in such storage area are visible to passersby, if the car is parked, and such articles are also exposed to sunlight entering through the window in the hatchback lid. Where articles stored in the storage area are of value, such as cameras, portable television sets, and the like, and visible through the window in the lid covering the storage area, pilfering and theft are encouraged. Furthermore, if the articles stored in such area are subject to damage by heat or sunlight, or both, the window in the lid provides entry for sunlight and such damage is apt to result.

In the past, some hatchback type automobiles have been provided with a flexible opaque cover for the storage area underlying the window in the lid, which cover was secured in place by a number of snaps or buttons extending around the periphery of the cover and attachable to mating snaps located on opposite sides of the storage area. To secure such covers in position required a good deal of effort and was time consuming, and to remove the cover to permit access to the storage area was equally bothersome. Furthermore, if the articles placed in the storage area extended upwardly above the plane in which such covers when fastened would lie, it became difficult if not impossible to secure the cover in position. Accordingly, even though such covers were provided they were rarely used and thus the protection which would otherwise be afforded was lost.

BRIEF SUMMARY OF THE INVENTION

According to the present invention, there is provided a cover for the storage area of an automobile which is particularly adapted for use with the hatchback type of design. In accordance with the present invention, the flexible cover is supported on either side by extensible or elastic supports secured at one end to the interior of the automobile adjacent the forward end of the storage area, and which supports are secured at their opposite ends to the lid covering the storage area adjacent the outer corners of such lid. The cover of the present invention underlies the window found in the hatchback type of automobile design and inasmuch as it is secured to the lid covering the storage area, it is automatically raised when the lid is raised and automatically closed when the lid is closed.

Thus, with the construction of the present invention it is not necessary to secure or release snaps or hooks holding a cover in position, the contents of the storage area is protected from sunlight and glare, and also obscured from view, and all of this is accomplished without requiring any action on the part of the user of the automobile.

BRIEF DESCRIPTION OF THE DRAWINGS

FIG. 1 shows an embodiment of the invention as used in a two-seater type automobile of the hatchback design showing the rear portion of the automobile including interior details of the storage area;

FIG. 2 is a view like FIG. 1 but showing the hatchback lid covering the storage area in raised position giving access to the storage area;

FIG. 3 is a view of the interior of the automobile of FIGS. 1 and 2 looking rearwardly from the instrument panel area toward the rear of the automobile;

FIG. 4 shows a modified form of construction adaptable for use in a four-seater automobile of the hatchback design, the figure being a rear elevational view of such car design;

FIG. 5 is a view like FIG. 4 but with the lid covering the storage area in open position; and FIG. 6 is a side view of the rear portion of the automobile of FIGS. 4 and 5 showing details of the interior of the storage area including the present invention.

DETAILED DESCRIPTION OF THE PREFERRED EMBODIMENT

Referring now to FIGS. 1, 2 and 3 of the drawings, there is shown an automobile 10 of the hatchback design. The automobile is a two-seater having seats 11 and 12 with a storage area 13 being provided in the rear portion of the car behind the seats. A lid 14 having a window 15 therein covers the storage area 13. The forward portion of the storage area terminates in two stanchions 16 and 17 upstanding from the floor of the car and extending from either side thereof toward the center, and the lid 14 when raised into the upper position shown in FIG. 2 is supported in that position by a pair of telescoping brackets 18 in the usual fashion. The lid itself is hinged at 19 to the top of the car and pivots about that hinge when opened and closed.

As indicated previously, it is the purpose of this invention to provide a cover covering the storage area 13, which cover automatically assumes its protective position when the lid 14 is closed as shown in FIG. 1, and which will move out of the way giving clear access to the storage area when the lid is in the position shown in FIG. 2.

The cover assembly of the present invention has been designated generally as 20 and includes a pair of elastic cords 21, each connected to the lid 14 near the outer edges thereof as indicated at 22, with the opposite ends of the elastic cords being secured at 23 to the top portions of the stanchions 16 and 17 adjacent each side of the storage area. Secured to and extending between the elastic cords 21 is an opaque flexible cover 24. As an added feature, the cover 24 may have an extension 25 overlying the stanchions and hanging downwardly in front of the stanchions behind the seats 11 and 12. Such overhang may be provided with pockets such as 26 for maps and other paraphernalia.

Inasmuch as the elastic cords 21 are anchored at points closely adjacent the sides of the storage area and the corners of the lid, when the lid is moved to the position shown in FIG. 2, the cover 24 is lifted completely out of the way as shown in that figure and thus provides no hindrance to access to the storage area. When the lid is closed, as shown in FIG. 1, the cover overlies the storage area as clearly seen in FIGS. 1 and 3, and thus protects the contents thereof from view as well as from the glare and heat of the sun.

Where the hatchback automobile is of the four passenger variety, i.e., having some form of rear seat, the form shown in FIGS. 4–6 may be employed. Referring now to those figures, there is shown an automobile 30 of the hatchback design having front seats 31 and 32 and a rear bench type seat 39. Behind the seat 39 is a storage area 33 covered by a lid 34 having a window 35 therein. The lid 34 is provided with the usual telescoping brackets 38 to hold the lid in open position permitting access to the storage area 33. The cover design 40 as shown in FIGS. 4–6, includes a pair of elastic cords 41 arranged in the same manner as the cords 21 of the embodiment previously described. Thus, each cord is secured at its outer end to the lid at points indicated as 42 with the cords being secured at their inner end to the top portion 36 of the back seat 39 at the points indicated by the reference character 43. A flexible cover of opaque material 44 is secured along its sides to the elastic cords 41 so that when the lid 34 is raised as shown in FIG. 5 the cover 44 is moved out of the way, and when the lid is closed as shown in FIG. 6 the cover 44 assumes the position shown therein. It will be noted that the cover 44 has an area sufficient to cover the storage area 33 protecting the contents therein from view and sunlight as previously described.

Thus it can be seen that the present invention provides an effective cover for the storage area of an automobile particularly of the hatchback type, which cover is automatically moved out of the way with raising of the lid covering the storage area and automatically returned to its protected position when the lid is closed.

I claim:

1. A cover for the storage area of an automobile having a lid for the storage area, said lid being hingedly mounted on the body of the automobile adjacent the inner edge of the lid, said cover comprising, a pair of elastic cord-like support members each having one end secured to the lid at points near the corners of the outer edge thereof and each support member having its other end secured to the interior of the automobile along the sides therein at the forward portion of the storage area, a sheet of flexible opaque material stretched between and supported by said support members, said sheet having an area sufficient to cover the major portion of the storage area when the lid is closed and said sheet moving upwardly with opening movement of the lid to expose said storage area when the lid is fully open.

2. A cover for the storage area of an automobile having a lid, said lid being hingedly mounted on the body of the automobile adjacent the inner edge of the lid and said lid having a window therein, said cover comprising, a pair of elastic cord-like support members each having one end secured to the lid at points near the corners of the outer edge thereof and each support member having its other end secured to the interior of the automobile along the sides therein at the forward portion of the storage area, a sheet of flexible opaque material stretched between and supported by said support members, said sheet underlying the window in the lid and having an area sufficient to cover the major portion of the storage area when the lid is closed and said sheet moving upwardly with opening movement of the lid to expose said storage area when the lid is fully open.

3. A cover for the storage area of an automobile having a lid for the storage area, said lid being hingedly mounted on the body of the automobile adjacent the inner edge of the lid which is provided with a window therein and when in the closed position lies in a plane closer to a horizontal plane than a vertical plane, said cover comprising, a pair of elastic cord-like support members each having one end secured to the lid at points near the outer corners thereof and each support member having its other end secured to the interior of the automobile along the sides therein at the forward portion of the storage area, a sheet of flexible opaque material stretched between and supported by said support members, said sheet underlying the window in the lid and having an area sufficient to cover the major portion of the storage area, said cover automatically moving upwardly to expose and give access to the storage area when the lid is opened, said cover automatically moving downwardly with the lid when the lid is closed to cover and obscure the storage area from view through said window.

* * * * *